United States Patent [19]

Mazelsky

[11] 4,066,149

[45] Jan. 3, 1978

[54] VARIABLE ENERGY ABSORBING SYSTEM

[75] Inventor: Bernard Mazelsky, West Covina, Calif.

[73] Assignee: ARA, Incorporated, West Covina, Calif.

[21] Appl. No.: 722,471

[22] Filed: Sept. 13, 1976

[51] Int. Cl.² ............................................. F16D 63/00
[52] U.S. Cl. ...................................... 188/1 C; 74/492
[58] Field of Search ...................... 188/1 C, 1 R, 1 B; 293/DIG. 3, 70, 1, 60, 85, 89; 74/492; 213/1 A, 1 R; 114/219

[56] References Cited

U.S. PATENT DOCUMENTS 3,369,634  2/1968  Mazelsky ............................. 188/1 C
3,748,922  7/1973  Farrell .................................... 74/492

Primary Examiner—Trygve M. Blix
Assistant Examiner—Douglas C. Butler
Attorney, Agent, or Firm—Herzig & Walsh

[57] ABSTRACT

An energy absorbing device which includes at least two concentrically arranged tubular elements which may be subjected to telescopic relative motion by the application of force to the opposite ends thereof. An annular space formed between the tubular elements may be provided with an helical coil so arranged therein that each turn of the coil comprises an arcuate body which is subjected to cyclic plastic deformation in tension and compression by rotation when relative movement occurs between the tubular members. A rod or bar may be fixed between the ends of the tubular member to prevent the relative telescopic movement until a predetermined force has been exerted on the energy absorbing device. An area of deliberate weakness may be formed in the rod or bar to insure that the bar will break when the predetermined force is applied to the device.

10 Claims, 3 Drawing Figures

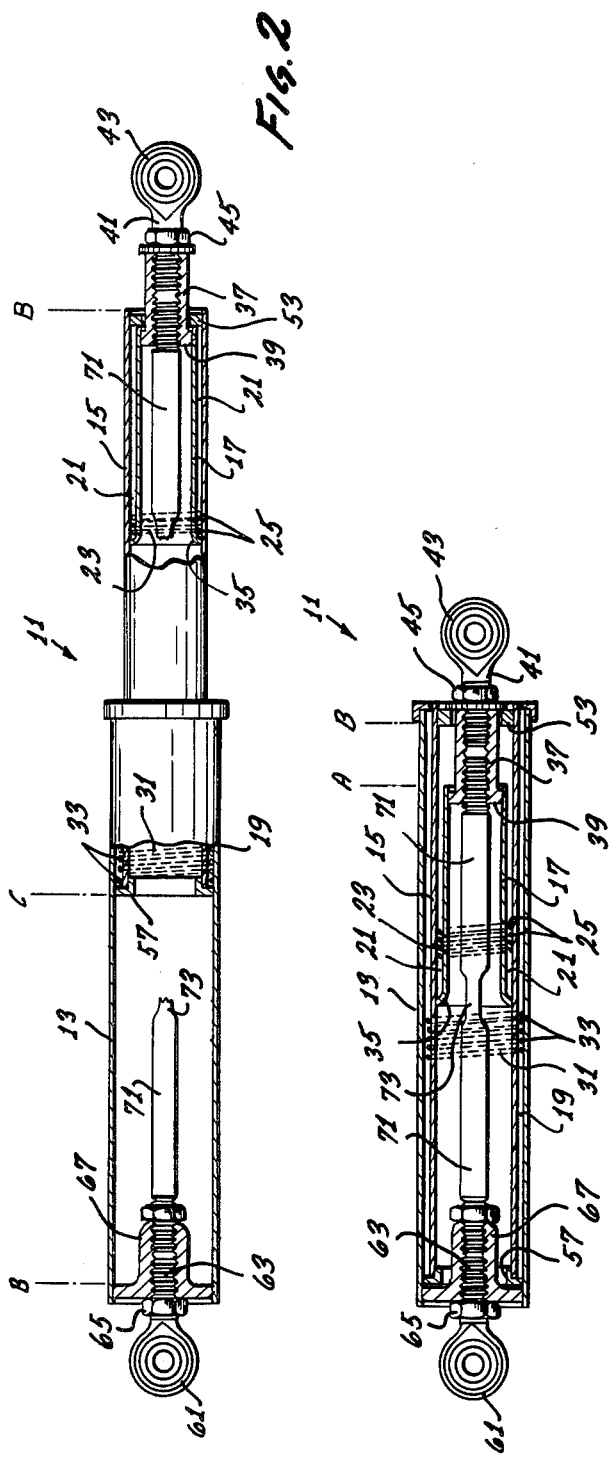

VARIABLE ENERGY ABSORBING SYSTEM

BACKGROUND OF THE INVENTION

In U.S. Pat. No. 3,369,634, assigned to the assignee hereof, there has been disclosed an energy absorbing device which is rather simple in construction and operation. This device has proven to be very acceptable and valuable since it operates on a simple principle which avoids the need for hydraulic fluid in valves, etc. which are difficult to adjust and, usually, allow the fluid to leak from them at points of wear, etc., sometime during their use. In general, those devices comprise two or more concentrically related tubes which are so arranged that the application of axial forces to the tubes cause them to move in telescopic relationship. Each tube is specifically constructed so as to form an annular space, within predetermined tolerance limits, with the adjacent tube.

A rather precisely sized helical coil may be located within the annular space so as to undergo continuous deformation between the adjacent walls of the tubular members. In general, when forces having axial components are initially applied to the prior art devices, energy will be absorbed with very small telescopic displacement until a predetermined amount of force is being applied to the device. Subsequently, as the force application continues, energy will be absorbed by larger distances of telescopic displacement, called "stroke." The level of the initial force required to generate increased telescopic displacement may be controlled by varying the number of turns in the helical coil.

Since the development of the prior art device, it has become apparent that there are many instances in which it is desirable to prohibit telescopic motion in any appreciable amount unless a predetermined force is first applied to the energy absorbing device. Also, it is desired to be able to control such a device after that predetermined force is initially applied, and then continues to be applied, to the device. In other words, it has become necessary and desirable to be able to control the shape of a force-displacement curve in a manner which will allow the achievement of goals which may be specified by the desired functions. For example, if an elastic or semi-elastic structure is to be protected by the energy absorbing device, it may be desirable to minimize the dynamic overshoot which could occur in the protected member, thereby increasing the probability that the member may be subjected to acceleration and deceleration forces without damage or injury. It has become necessary, if such control is to be accomplished, to modify and improve upon the prior art structures if the advantages of simplicity, avoidance of hydraulic fluids, etc., are to be avoided.

SUMMARY OF THE INVENTION

The present invention relates to an improvement in energy absorbing devices of the type described in U.S. Pat. No. 3,369,634. More particularly, the invention relates to a device which may be employed to absorb and dissipate energy in a precisely controlled manner. In the preferred embodiment, the device may be employed to dissipate energy by directing it along a particularly defined axial direction in controlled sequential steps.

Energy absorbing devices often operate without regard to the particular nature of the apparatus being protected. In other words, the prior art devices available had to be used whether the apparatus being protected was a rigid or elastic mass. When the mass being protected is elastic, damage will often occur, not as a result of the transmittal of the initial shock to the mass, but as a result of oscillations which occur in the mass itself after the initial shock is imposed. The oscillations are often referred to as "dynamic overshoot of acceleration."

The present invention minimizes and eliminates the possibility of damage or injury as a result of such force oscillation by providing structure which absorbs a force of a predetermined maximum value with a relatively small movement of the energy absorbing structures within the device. When that predetermined force value has been reached, a second stage of operation will be undergone in which force continues to be absorbed, at a slightly reduced level, over a longer relative movement of the energy absorbing structure. As force continues to be applied to the device, a third stage of operation commences in which an intermediate level of force can be absorbed in a relatively long movement of the energy absorbing structures.

In other words, force is initially transmitted through the absorber mechanism at a relatively high level, is then reduced to a relatively low level, and is then increased to an intermediate, substantially constant level. As a result, a device formed in accordance with the present invention not only minimizes the possibility of damage to the apparatus being protected, but can be used to take advantage and cooperate with the inherent elastic capabilities of the apparatus to minimize potential damage.

A device formed in accordance with the present invention may comprise a series of concentrically arranged tubes which are precisely oriented so as to provide annular chambers between adjacent tubes. Helical coils, each having a predetermined number of turns, may be positioned within the annular chambers so as to be in friction contact with the outer wall of the smaller tube and the inner wall of the larger tube. In this manner, relative axial motion of the tubes causes the turns of the coil to absorb and dissipate energy by cyclic deformation in tension and compression. Although any number of concentric tubes may be utilized, the present invention envisions the use of three tubes which cooperate in the manner described in two discrete stages.

In order to provide that the device first transmit the predetermined maximum force described previously, the invention also may, for example, employ a rigid rod having a deliberately calculated and formed point of weakness which will break or rupture only when a predetermined axial force is exerted on it. The rod may be fixedly attached to one end of a tube which forms a part of the first tubular energy dissipation system, and to the distal end of a tube which forms a part of the second energy dissipation system.

With structure of this type, as an axial force is applied to the energy absorber, energy will begin to be absorbed by the first tubular dissipation system as the rod is being stressed to its breaking point. During this time, relative movement of the tubes in the first system will be rather small. When the rod breaks, the first tubular system will continue to absorb energy but the relative movement, or stroke, will be much larger. When the first tubular system has reached the limit of its energy absorbing capability, the second tubular system will then commence its stroke and will continue to absorb energy at a substantially constant rate until it also has reached the limit of its capability. Those skilled in the art will realize, of course, that additional tubular system could be employed if desired.

In any event, it will be realized that the device described in this application is only one exemplary embodiment of the invention and that any number of embodiments, many of which may not even resemble that illustrated and described here, are possible.

It is therefore an object of the present invention to provide an energy absorbing device for the absorption and dissipation of energy in sequentially controlled steps.

It is a further object of the present invention to provide an energy absorbing device which minimizes and substantially eliminates the possibility of damage or injury to an elastic mass subjected to shock forces with produce oscillations in the elastic mass, more commonly known as dynamic overshoot of acceleration.

It is also an object of the present invention to provide an energy absorbing device which absorbs a force of a pre-determined maximum value with a relatively small movement of the energy absorbing structures within the device, and when said pre-determined force has been reached, a second stage energy absorption occurs at a lower force level and thereafter a third stage of energy absorption commences in which an intermediate level of force is absorbed.

It is still a further object of the present invention to provide an energy absorbing device having concentrically arranged tubes so as to provide annular chambers wherein helical coils within the annular chambers absorb and dissipate energy by cyclic deformation in two discrete stages.

It is also an object of the present invention to provide an energy absorbing device having a rod means therein designed to rupture when a pre-determined actual force is applied thereto and after rupture occurs, energy continues to be absorbed by a first tubular system, and thereafter by a second tubular system at a substantially constant rate.

BRIEF DESCRIPTION OF THE DRAWINGS

FIG. 1 comprises a longitudinal sectional view of a non-constant force-displacement energy absorber formed in accordance with the present invention in its installed configuration;

FIG. 2 comprises a view similar to FIG. 1, showing the device in its stroked configuration, i.e., its ability to absorb energy has been exhausted; and FIG. 3 comprises a graph illustrating the force-stroke relationship of the operation of the device shown in FIGS. 1 and 2.

DETAILED DESCRIPTION

As shown in FIG. 1, an energy absorbing device 11 may comprise an outer tube 13, an intermediate tube 15, and an inner tube 17, all of which are arranged in concentric alignment. Of course, the invention could be employed, if desired, utilizing only two tubes or more than three.

The annular spaces 19 and 21 between the tubes 13 and 15 and the tubes 15 and 17, respectively, are preferably formed so as to be within precise tolerance limits. Within annular chamber 21, an helical coil 23 may be located having a plurality of turns 25. Any number of turns may be provided, depending upon the amount of energy which it is desired to dissipate, but for the sake of clarity, only three have been illustrated. Preferably, coil 23 is a solid, non-elastomeric, radially uncompressed body. Each turn 25 constitutes an arcuate body adapted to be subjected to cyclic plastic deformation in tension and compression when the turn is rotated about its internal axis.

Within the annular chamber 19, a coil 31 may be located having a plurality of turns 33. Coil 31 may be substantially identical to coil 33, except for the radius of the coil. Each of the coils are so sized as to be in friction contact with the tube on their common internal radius and in friction contact with the tube on their common external radius. Thus, when the tubes are axially moved relative to one another, as will be described below, each turn in the coil will be forced to revolve about its internal axis and the cyclic deformation which then occurs will absorb and dissipate energy.

Of course, those skilled in the art will realize that, if desired, these energy absorbing systems could include containment cages, tapering of the tubular members, etc., as described in U.S. Pat. No. 3,369,643, the disclosure of which is hereby incorporated herein insofar as may be necessary.

As shown in FIG. 1, one end of tube or sleeve 17 may be provided with a flared end or cap 35 which cooperates with the coil 23 to prevent the latter from moving past the end of the tube when relative motion between tubes occurs. At the opposite end of tube 17, a sleeve 37 may be fastened thereto by means of a shoulder 39 which may be fixed within the end of the tube 17 by any suitable means such as welding, threading, etc.

The interior of sleeve 37 may also be threaded to receive the end of an eyebolt 41 which may be integral with an attachment device such as a socket end 43. If desired, the eyebolt 41 may be locked into position against the end of sleeve 37 by means such as a nut 45.

At the end of tube 15 adjacent the eyebolt 41, a washer-like member 53 may be fixedly located for cooperation with the end of tube 13 and the shoulder 39 in the manner illustrated in FIG. 2. Thus, when eyebolt 41 is pulled to the right by the exertion of force on socket end 43, tube 17 will be pulled in that direction relative to tube 15 until shoulder 39 and the washer-like member 53 contact one another. Up until that time, coil 23 will have been absorbing and dissipating energy by its frictional contact with the relatively moving tubes 15 and 17.

When the shoulders 39 and 53 contact, tube 15 will then also begin moving to the right relative to the tube 13. As that occurs, coil 31 will absorb and dissipate energy due to the frictional contact with the adjacent walls which form the annular chamber 19. As the tube 15 moves to the right, an end shoulder cap member 57 may be employed to contact the coil 31 and prevent it from moving off of the end of the tube. Thus, as the eyebolt 41 continues to move toward the right, energy will be dissipated in the coil 33.

At the opposite end of the device 11 from the socket end 43, a second socket end 61 may be attached by suitable means such an an eyebolt 63 and nut 65 in cooperation with a second sleeve 67 which is fixed in the end of the end of tube 13 as shown. Thus, the device may be fixed between two structural members by means of the end sockets 43 and 61 to absorb and dissipate energy created by force exerted between the two elements.

In order to further control the dissipation of energy by this device, a member 71 may be attached and, for example, threadedly connected to the sleeves 37 and 67 as illustrated in FIG. 1. Although it is preferred that element 71 be a rod or bar, those skilled in the art will also realize that, if desired, it could be a tubular member. For the sake of convenience, however, it will be referred to here as a rod or bar. In any event, the rod 71 may be provided with a section 73 of precisely machined or ground diameter which may, for example, be heat treated to yield a precise breaking or rupture point. In other words, it has a very precisely controlled elastic modulus.

Referring now to FIGS. 1-3 together to illustrate the operation of the preferred embodiment which has been depicted in the drawings, it can be seen that point A on the forcestroke (distance) graph of FIG. 3 corresponds to the cooperative relationship of the device in the installed configuration as shown in FIG. 1. For the sake of this description, it will be assumed that socket end 61 is fixed to a rigid structure and that socket end 43 is attached to a moveable or elastic structure. When a force having an axial component is applied between the socket ends 43 and 61, sleeve 37 will tend to move to the right, as seen in the Figures, drawing the inner tube 17 along with it and tending to stretch the rod 71 particularly at the reduced diameter section 73.

If the force is sufficiently large, it will cause the point of weakness 73 to rupture. On the graph, this has been delineated by the notation A'. Thus, a relatively large force must be exerted before the point of weakness 73 will actually rupture, but that force will be exerted over a relatively short stroke distance. In other words, the tube 17 will move very slightly to the right until the section 73 of rod 71 finally ruptures. Then, the tube 17 will move further to the right until the shoulder 39 abuts the washerlike member 53 at the point depicted at B in FIGS. 1 and 3. Such abutment has been illustrated at the right hand portion of FIG. 2.

As can be seen by reference to FIG. 3, after the rupturing of the rod has occurred, the amount of force which will be dissipated by the coil 23 between tubes 15 and 17 will be reduced to the level at B' in FIG. 3, while the stroke distance will be relatively larger, to the position denoted at B. Of course, FIG. 3 depicts a substantially ideal force-stroke curve for the protection of at least some elastic bodies, but the actual curve for the illustrated embodiment is approximately that depicted. The actual force and distance values may be adjusted by coil alteration, section 73 size adjustment, etc.

Once shoulder 39 has entered into full abutment with the washer-like member 53, the coil will commence dissipating energy between tubes 13 and 15 through the stroke from B to C. As can be seen in FIG. 3, the force, or energy dissipated in the second stage of the device 11 is at C', which is relatively greater than the level B' for the first stage between tubes 15 and 17. This difference is proportional to the difference between the number of turns in coils 23 and 21 and the internal axial circumference of each turn within those coils, assuming that they are of the same material.

In this manner, those skilled in the art, having read the preceding teaching, will be capable of producing an energy absorbing device which is capable of resisting rebound forces after a complete stroking is obtained since the coils 31 and 23 are operative to resist axial motion in either direction, and thus absorb energy. Consequently, even structures which are relatively elastic can be protected by use of a device such as this since dynamic overshoot will be minimized or eliminated.

Those skilled in the art will also realize that a wide variety of devices may be employed which utilize the present invention, many of which may not even physically resemble that depicted in the drawing, but which, nevertheless, enjoy the full advantages and results of the invention as defined in the following claims.

I claim:

1. An energy absorbing device comprising:
an outer tubular member;
an intermediate tubular member movably disposed within said outer tubular member; and
an inner tubular member movably disposed within said intermediate tubular member, forming
a first chamber between said inner and intermediate tubular members and
a second chamber between said intermediate and outer tubular members,
first coil means located in said first chamber in frictional engagement with said inner and intermediate tubular members,
second coil means located in said second chamber in frictional engagement with said intermediate and outer tubular members, and
means for transmitting force between said inner member and said outer member, said first coil means and said second coil means absorbing energy by continuous cyclic plastic deformation thereof and at different force levels.

2. The device of claim 1 including:
means for restricting relative motion between said tubular members until a force of predetermined size has been applied thereto.

3. The device of claim 2 wherein
said restricting means comprises:
means extending between and fixed to said inner and outer tubular members for limiting relative movement therebetween.

4. The device of claim 3 wherein
said restricting means includes:
a relatively weak portion such that said restricting means will break upon the application of said force of predetermined size.

5. A variable energy absorbing system comprising:
an outer member;
an inner member positioned within said outer member for movement in one direction therein;
first energy absorbing means, mounted between said inner member and said outer member, for absorbing energy by cyclic plastic deformation, in response to relative movement between said inner member and said outer member;
second energy absorbing means connected between said inner and outer members and resisting relative movement therebetween in said one direction, said second energy absorbing means being plastically deformable to absorb energy at levels of force within a preselected range of forces in only a first range of relative movement between said inner member and said outer member, said first energy absorbing means being continuously deformable to absorb energy within said preselected range of levels of force and in a second range of relative movement between said inner member and said outer member, said second range of relative movement being larger than said first range of relative movement, said second energy absorbing means including actuating means for rendering the same inactive upon application of a force exceeding said preselected range of force.

6. The invention as set forth in claim 5 wherein said actuating means comprises means for rupturing said second energy absorbing means.

7. The invention as set forth in claim 5 wherein said first energy absorbing means comprises a plurality of helical coils having an internal axis, said helical coils being rotatable about said internal axis upon relative motion between said inner member and said outer member to absorb energy thereby.

8. The invention as set forth in claim 5 further including an intermediate member movably positioned between said inner member and said outer member and wherein said first energy absorbing means is disposed between said inner member and said intermediate member, and further including a third energy absorbing means disposed between said intermediate member and said outer member, said third energy absorbing means being continuously cyclically and plastically deformable to absorb energy at a force greater than that at which said first energy absorbing means absorbs energy and with a third relative movement, said third relative movement being greater than said second relative movement.

9. The invention as set forth in claim 8 wherein said first energy absorbing means comprises helical coil means frictionally engaged between said inner member and said intermediate member and wherein said third energy absorbing means comprises first helical coil means frictionally engaged between said inner member and said intermediate member and said third energy absorbing means comprises second helical coil means frictionally engaged between said outer member and said intermediate member, said first helical coil means and said second helical coil means each having an internal axis and being continuously deformable to rotate around said internal axes to absorb energy by cyclic plastic deformation.

10. The invention as set forth in claim 5 wherein said second energy absorbing means includes means having a predetermined elastic modulus resulting in rupture of said second energy absorbing means upon application of a force of predetermined size thereto.

* * * * *